(12) United States Patent
Wang et al.

(10) Patent No.: US 11,738,268 B2
(45) Date of Patent: Aug. 29, 2023

(54) GAME DEVELOPMENT METHOD AND APPARATUS, GAME RUNNING METHOD AND APPARATUS, AND ELECTRONIC DEVICE

(71) Applicant: Xiamen Yaji Software Co., Ltd, Fujian (CN)

(72) Inventors: Zhe Wang, Fujian (CN); Shun Lin, Fujian (CN)

(73) Assignee: Xiamen Yaji Software Co., Ltd

( * ) Notice: Subject to any disclaimer, the term of this patent is extended or adjusted under 35 U.S.C. 154(b) by 0 days.

(21) Appl. No.: 17/772,434

(22) PCT Filed: Sep. 16, 2020

(86) PCT No.: PCT/CN2020/115676
§ 371 (c)(1),
(2) Date: Apr. 27, 2022

(87) PCT Pub. No.: WO2021/082785
PCT Pub. Date: May 6, 2021

(65) Prior Publication Data
US 2022/0370912 A1 Nov. 24, 2022

(30) Foreign Application Priority Data
Oct. 28, 2019 (CN) .......................... 201911032113.9

(51) Int. Cl.
*A63F 13/60* (2014.01)
*G06F 8/36* (2018.01)
(52) U.S. Cl.
CPC ................ *A63F 13/60* (2014.09); *G06F 8/36* (2013.01); *A63F 2300/6009* (2013.01)
(58) Field of Classification Search
CPC ..... A63F 13/60; A63F 2300/6009; G06F 8/36
See application file for complete search history.

(56) References Cited

U.S. PATENT DOCUMENTS 9,891,910 B1\* 2/2018 Cumming ............. H04L 67/025
11,188,390 B2\* 11/2021 Brebner ................ G06F 9/5055
(Continued)

FOREIGN PATENT DOCUMENTS

CN 104850778 A 8/2015
CN 106126268 A 11/2016
(Continued)

OTHER PUBLICATIONS

Prefabs. docs.unity3d.com. Online. Jan. 16, 2019. Accessed via the Internet. Accessed Dec. 14, 2022. <URL: https://web.archive.org/web/20190116161755/https://docs.unity3d.com/Manual/Prefabs.html> (Year: 2019).\*
(Continued)

*Primary Examiner* — Thomas J Hong
*Assistant Examiner* — Carl V Larsen
(74) *Attorney, Agent, or Firm* — Lerner David LLP (57) ABSTRACT

A game development method and apparatus, a game running method and apparatus, and an electronic device. The game development method comprises: receiving a development instruction for a target function of a game (S101); obtaining a target prefabricated part corresponding to the target function from a preset database on the basis of the development instruction, a plurality of prefabricated parts being pre-stored in the database, each prefabricated part corresponding to one function setting, and each prefabricated part comprising a control configured with a preset logic, an application interface, and a backend invocation cloud function (S102); and developing the target function of the game according to the target prefabricated part (S103). According to the method, the development workload can be effectively reduced, the development labor cost and the later server maintenance cost are reduced, and thus the development efficiency is effectively improved.

10 Claims, 3 Drawing Sheets

(56) References Cited

U.S. PATENT DOCUMENTS

| | | | | |
|---|---|---|---|---|
| 2008/0254896 | A1* | 10/2008 | Sispoidis | G06Q 30/02 463/43 |
| 2015/0057078 | A1* | 2/2015 | Moore | A63F 13/35 463/31 |
| 2015/0074641 | A1 | 3/2015 | Nambiar et al. | |
| 2020/0004598 | A1* | 1/2020 | Brebner | G06F 9/5055 |
| 2021/0056201 | A1* | 2/2021 | Eftekhari Roozbehani | G06F 21/577 |

FOREIGN PATENT DOCUMENTS

| | | |
|---|---|---|
| CN | 107320956 A | 11/2017 |
| CN | 107684721 A | 2/2018 |
| CN | 108509193 A | 9/2018 |
| CN | 108595172 A | 9/2018 |
| CN | 108786112 A | 11/2018 |
| CN | 109857392 A | 6/2019 |
| CN | 109871208 A | 6/2019 |
| CN | 109918112 A | 6/2019 |
| KR | 20140099415 A | 8/2014 |

OTHER PUBLICATIONS

Multiplayer Overview. docs.unity3d.com. Online. Aub. 3, 2019. Accessed via the Internet. Accessed Dec. 12, 2022. <URL: https://web.archive.org/web/20190803201919/https://docs.unity3d.com/Manual/UNetOverview.html> (Year: 2019).*

Network Manager. docs.unity3d.com. Online. Dec. 4, 2018. Accessed via the Internet. Accessed Dec. 12, 2022. <URL: https://web.archive.org/web/20181204043503/https://docs.unity3d.com/Manual/class-NetworkManagerUNet.html> (Year: 2018).*

International Search Report for Application No. PCT/CN2020/115676 dated Dec. 17, 2020, 2 pgs.

Search Report dated Mar. 31, 2021 from the Office Action for Chinese Application No. 2019110321139 dated Apr. 7, 2021, 2 pages.

Supplemental Search Report dated Dec. 30, 2021 from the Office Action for Chinese Application No. 2019110321139 dated Jan. 14, 2022, 2 pages.

* cited by examiner

GAME DEVELOPMENT METHOD AND APPARATUS, GAME RUNNING METHOD AND APPARATUS, AND ELECTRONIC DEVICE

CROSS-REFERENCES TO RELATED APPLICATIONS

The present application is a U.S. national phase entry under 35 U.S.C. § 371 of International Application No. PCT/CN2020/115676 filed Sep. 16, 2020, which claims priority from Chinese Patent Application No. 201911032113.9 filed on Oct. 28, 2019, all of which are hereby incorporated by reference in its entirety.

TECHNICAL FIELD

The present disclosure relates to electronic games, and particularly to a game developing method, a game running method, a game developing device, a game running device and an electric apparatus.

BACKGROUND

During developing a game, a developer always needs to configure each function of a client and build a server for adding respective backend relevant functions. For example, each time a function is developed, it is necessary to set up a control which corresponds to the function, set up an application program interface which corresponds to the control, and then set up a corresponding backend calling cloud function. This results in relatively heavy development workload, high server maintenance and labor costs, and relatively low development efficiency.

SUMMARY

In a first aspect, there is provided a game developing method which can include:
receiving a developing instruction for a target function of a game;
obtaining a target prefab which corresponds to the target function from a preset database on basis of the developing instruction, wherein a plurality of prefabs are stored in the database in advance, each of the prefabs corresponds to a functional setting, and each of the prefabs includes a control, an application program interface and a backend calling cloud function which have been configured with a preset logic; and
developing the target function of the game according to the target prefab.

In an optional embodiment of the first aspect, the method can further include: prior to obtaining the target prefab which corresponds to the target function from the preset database on basis of the developing instruction,
obtaining a plurality of controls which respectively correspond to a plurality of functions, a plurality of application program interfaces which respectively correspond to the plurality of functions and a plurality of backend calling cloud functions which respectively correspond to the plurality of functions;
configuring a control, an application program interface and a backend calling cloud function which correspond to a same function with the preset logic, to generate a prefab which corresponds to the function; and
storing the generated prefabs in the database.

In an optional embodiment of the first aspect, the database can be arranged in a game editor,
the step of obtaining the target prefab which corresponds to the target function from the preset database can include:
obtaining the target prefab which corresponds to the target function from the database of the game editor; and
showing the target prefab in a developing and editing interface of the game editor.

In a second aspect, there is provided a game running method which can include:
receiving a running instruction for a target function of a game from a user; and
calling the target prefab which corresponds to the target function on basis of the running instruction to run the target function, wherein the prefab includes a control, an application program interface and a backend calling cloud function which have been configured with the preset logic and correspond to the target function.

In an optional embodiment of the second aspect, the method can further include: after calling the target prefab which corresponds to the target function on basis of the running instruction,
transmitting a calling notification for a backend calling cloud function of the target prefab to a backend cloud function computing platform, wherein the calling notification includes an internet protocol address of a user terminal, and
wherein the calling notification instructs the backend cloud function computing platform to select a server corresponding to the internet protocol address for interaction and transmit interaction data to the user terminal to run the target function.

In a third aspect, there is provided a game developing device which can include:
a first receiving module, configured to receive a developing instruction for a target function of a game;
an obtaining module, configured to obtain a target prefab which corresponds to the target function from a preset database on basis of the developing instruction, wherein a plurality of prefabs are stored in the database in advance, each of the prefabs corresponds to a functional setting, and each of the prefabs includes a control, an application program interface and a backend calling cloud function which have been configured with a preset logic; and
a developing module, configured to develop the target function of the game according to the target prefab.

In an optional embodiment of the third aspect, the game developing device can further include a storing module which is configured to:
obtain a plurality of controls which respectively correspond to a plurality of functions, a plurality of application program interfaces which respectively correspond to the plurality of functions and a plurality of backend calling cloud functions which respectively correspond to the plurality of functions;
configure a control, an application program interface and a backend calling cloud function which correspond to a same function with the preset logic, to generate a prefab which corresponds to the function; and
store the generated prefabs in the database.

In an optional embodiment of the third aspect, the database can be arranged in a game editor,
the obtaining module can be further configured to: when obtaining the target prefab which corresponds to the target function from the preset database,
obtain the target prefab which corresponds to the target function from the database of the game editor; and show the target prefab in a developing and editing interface of the game editor.

In a fourth aspect, there is provided a game running device which can include:

a second receiving module, configured to receive a running instruction for a target function of a game from a user;

a calling module, configured to call the target prefab which corresponds to the target function on basis of the running instruction to run the target function, wherein the prefab includes a control, an application program interface and a backend calling cloud function which have been configured with the preset logic and correspond to the target function.

In an optional embodiment of the fourth aspect, the game running device can further include a selecting module which is configured to:

transmit a calling notification for a backend calling cloud function of the target prefab to a backend cloud function computing platform, wherein the calling notification comprises an internet protocol address of a user terminal, and wherein the calling notification instructs the backend cloud function computing platform to select a server which corresponds to the internet protocol address for interaction and transmit interaction data to the user terminal to run the target function.

In a fifth aspect, there is provided an electric apparatus which can include: one or more processors, a memory, and one or more application programs, wherein the one or more application programs are stored in the memory, and configured to, when executed by the one or more processors, implement the game developing method of the first aspect of the present disclosure.

In a sixth aspect, there is provided an electric apparatus which can include: one or more processors, a memory, and one or more application programs, wherein one or more application programs are stored in the memory, and configured to, when executed by the one or more processors, implement the game running method of the second aspect of the present disclosure.

In a seventh aspect, there is provided a computer-readable storage medium in which a computer program is stored, characterized in that, when the computer program is executed by a processor, the computer program implements the game developing method of the first aspect of the present disclosure.

In an eighth aspect, there is provided a computer-readable storage medium in which a computer program is stored, characterized in that, when the computer program is executed by a processor, the computer program implements the game running method of the second aspect of the present disclosure.

Additional aspects and advantages of the present disclosure, which are given in part in the following description, will become apparent from the following description, or will be understood through practice of the present disclosure.

BRIEF DESCRIPTION OF THE DRAWINGS

For purpose of illustrating more clearly the technical solutions according to embodiments of the present disclosure, a brief introduction is made for accompanying drawings which will be used for illustrating embodiments of the present disclosure.

DETAILED DESCRIPTION

Embodiments of the present disclosure will be elucidated hereinafter, and examples of the embodiments are shown in the accompanying drawings. Identical or similar reference numerals indicate identical or similar elements or elements with identical or similar functions throughout the accompanying drawings. The embodiments described below by referring to the drawings are exemplary and are only for the purpose of explaining the present application and are not to be construed as limiting the present application.

As can be understood by the skilled in the art, the singular forms "a", "an", "said" and "the" as used herein can include the plural forms as well, unless the context clearly indicates otherwise. As can be further understood, the terms "comprise" and/or "comprising", when used in the description of the present disclosure, specify the presence of the stated features, integers, steps, operations, elements, and/or components, but do not preclude the presence or addition of one or more other features, integers, steps, operations, elements, components, and/or groups thereof. It will be understood that, when a certain element is referred to as being "connected to" or "coupled to" another element, the element may be directly connected to or directly coupled to the other element, or at least one intervening element may be interposed therebetween. In addition, "connected to" or "coupled to" as used herein may include wireless connection or wireless coupling. As used herein, the term "and/or" includes all or any of one or more associated listed items or combinations thereof.

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

A game developing method, a game developing device, an electric apparatus and a computer-readable storage medium of the present disclosure intend to solve the technical problems in the prior art as described above.

The technical solutions of the present disclosure and how the technical solutions of the present disclosure solve the above technical problems will be described in detail hereinafter with reference to specific embodiments. These specific embodiments can be combined with each other, and description for identical or similar concepts or processes may be omitted in some embodiments. Embodiments of the present disclosure will be elucidated hereinafter in conjunction with the accompanying drawings.

Figure 1:
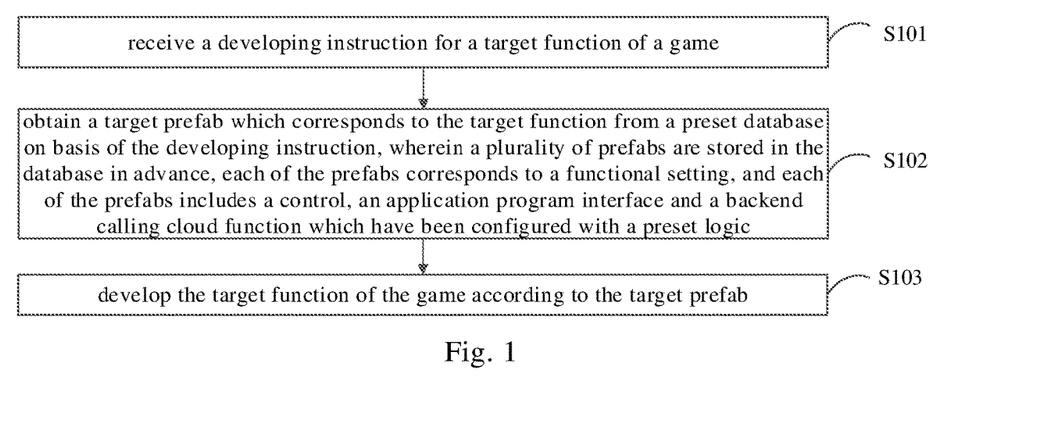
FIG. 1 is a flowchart illustrating a game developing method according to an embodiment of the present disclosure.

In a possible implementation according to embodiments of the present disclosure, as shown in FIG. 1, there is provided a game developing method, which can include the following steps.

Step S101, a developing instruction for a target function of a game is received.

In particular, a development user can develop a plurality of functions of a game by means of a game editor. The developing instruction can be triggered by the development user inputting a target function to the game editor, and can also be triggered by clicking or touching a screen in the game editor. The specific form of the developing instruction is not limited in this description.

Step S102, a target prefab which corresponds to the target function is obtained from a preset database on basis of the developing instruction. A plurality of prefabs are stored in the database in advance, each of the prefabs corresponds to a functional setting, and each of the prefabs includes a control, an application program interface and a backend calling cloud function which have been configured with a preset logic.

Wherein, the backend calling cloud functions which are common in game developing can include various functions, e.g., server communication, sensitive word filtering, AI (Artificial Intelligence) smart filtering, archive preset time, AI customer service, and the like.

In particular, various controls, application program interfaces and backend calling cloud functions are grouped. A control, an application program interface and a backend calling cloud function which correspond to a function are configured with a preset logic which corresponds to the function, so that a prefab which corresponds to this function is obtained.

In implementations, during developing a target function, it is not necessary to search for the control, the application program interface and the backend calling cloud function which correspond to the target function and then configure the control, the application program interface and the backend calling cloud function in real time. Instead, the prefab which corresponds to the target function is directly obtained, then the development of the control and the application program interface for the front end of the target function is completed, and the development of the backend calling cloud function for the backend of the target function is completed. This can effectively save developing time.

In an implementing process, an application program interface and a backend calling cloud function which correspond to a same function can be encapsulated in a control which corresponds to the same function. When calling of the control is triggered, calling of the corresponding application program interface and backend calling cloud function is triggered.

In other implementing processes, a control, an application program interface and a backend calling cloud function which correspond to a same function can also be combined and configured in other forms. The specific forms for combining and configuring are not limited, provided that calling of the corresponding application program interface and backend calling cloud function can be triggered when calling of the control is triggered.

Step S103, the target function of the game is developed according to the target prefab.

In particular, once the target prefab which corresponds to the target function is obtained, the control, the application program interface and the backend calling cloud function which correspond to the target function are obtained. On the basis that the control, the application program interface and the backend calling cloud function have been configured with the preset logic, the development of the control and the application program interface for the front end of the target function can be completed, and the development of the backend calling cloud function for the backend of the target function can be completed.

In the above embodiments, a plurality of prefabs are stored in the database in advance, each of the prefabs corresponds to a functional setting, and each of the prefabs includes a control, an application program interface and a backend calling cloud function which have been configured with a preset logic. Upon receipt of a developing instruction for a target function of a game, the target prefab which corresponds to the target function is obtained from the preset database, and then the target function of the game is developed according to the target prefab. In development process, it is not necessary to configure the control, the application program interface or the backend calling cloud function. This can effectively reduce development workload and decrease labor, so as to effectively improve developing efficiency.

In a possible implementation according to embodiments of the present disclosure, prior to the target prefab which corresponds to the target function being obtained from the preset database on basis of the developing instruction in Step S102, the game developing method can further include the following steps.

(1) a plurality of controls which respectively correspond to a plurality of functions, a plurality of application program interfaces which respectively correspond to the plurality of functions and a plurality of backend calling cloud functions which respectively correspond to the plurality of functions are obtained.

(2) a control, an application program interface and a backend calling cloud function which correspond to a same function are configured with the preset logic, to generate a prefab which corresponds to the function.

(3) the generated prefabs are stored in the database.

In particular, various controls, application program interfaces and backend calling cloud functions are grouped. A control, an application program interface and a backend calling cloud function which correspond to a function are configured with a preset logic which corresponds to the function, so that a prefab which corresponds to this function is obtained.

Figure 2:
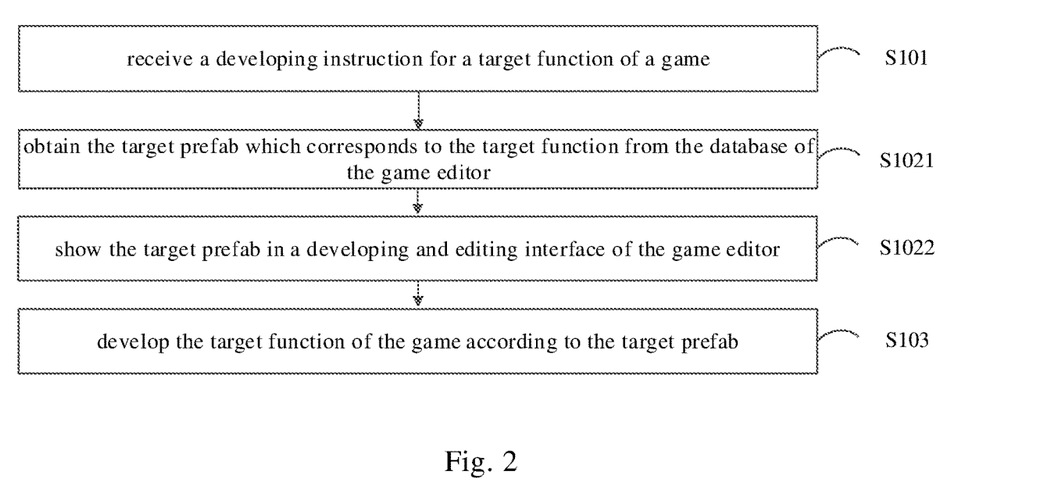
FIG. 2 is a flowchart illustrating a game developing method according to an embodiment of the present disclosure.

In a possible implementation according to embodiments of the present disclosure, the database is arranged in a game editor. As shown in FIG. 2, the target prefab which corresponds to the target function being obtained from the preset database in Step S102 can include the following steps.

Step S1021, the target prefab which corresponds to the target function is obtained from the database of the game editor.

Step S1022, the target prefab is showed in a developing and editing interface of the game editor.

Figure 3:
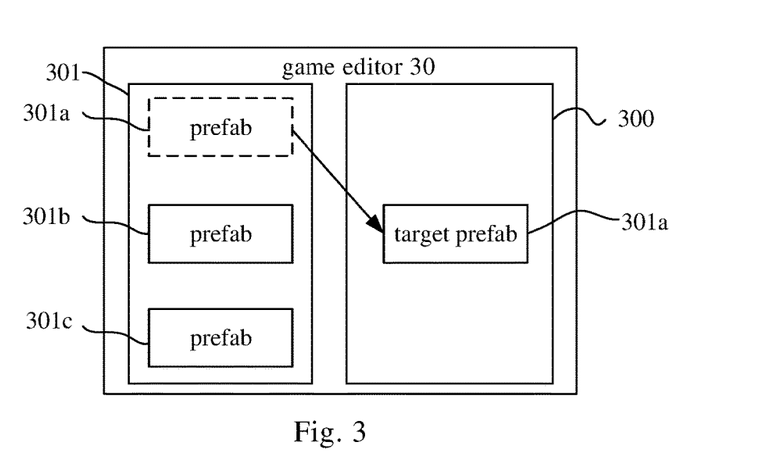
FIG. 3 is a schematic diagram illustrating a game editor interface according to an embodiment of the present disclosure.

In an implementing process, as shown in FIG. 3, a plurality of prefabs can be stored in a database in advance, and each of the prefabs is a visual component and can be directly moved or copied as needed. For example, a database 301 which comprises a prefab 301*a*, a prefab 301*b* and a prefab 301*c* is arranged in a game editor 30. When it is required to obtain the target prefab 301*a*, the target prefab 301*a* is directly dragged from the database 301 to an editing interface 300 of the game editor.

In other implementing processes, a database in which a plurality of prefabs are stored is arranged in a game editor, a target function can be directly input in the game editor, and a target prefab can be directly showed in the editing interface of the game editor. The specific processes for obtaining the target prefab are not limited in this description.

In the game developing method as described above, a plurality of prefabs are stored in the database in advance, each of the prefabs corresponds to a functional setting, and each of the prefabs includes a control, an application program interface and a backend calling cloud function which have been configured with a preset logic. Upon receipt of a developing instruction for a target function of a game, the target prefab which corresponds to the target function is obtained from the preset database, and then the target function of the game is developed according to the target prefab. In development process, it is not necessary to configure the control, the application program interface or the backend calling cloud function. This can effectively reduce development workload and decrease labor, so as to effectively improve developing efficiency.

In addition, the prefabs are directly bound to the cloud functions. Thus, it is not necessary for the developers to build the server or manage the operations and maintenance of the server, by themselves. This increases efficiency, decreases costs, and provides enhanced scalability.

Figure 4:
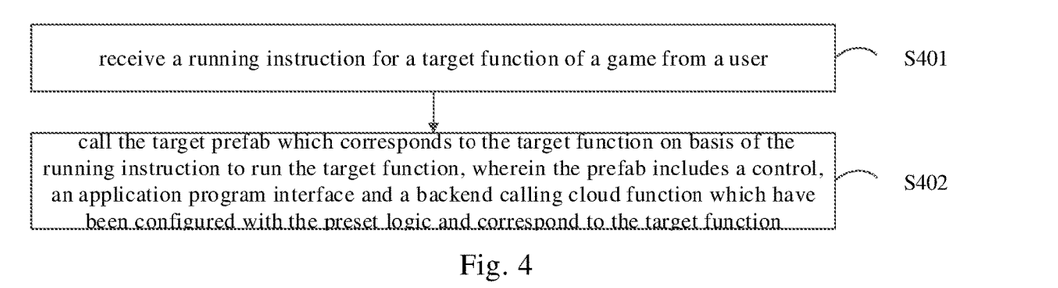
FIG. 4 is a flowchart illustrating a game running method in an example according to an embodiment of the present disclosure.

In a possible implementation according to embodiments of the present disclosure, as shown in FIG. 4, there is provided a game running method which can include the following steps.

Step S401, a running instruction for a target function of a game is received from a user.

In particular, the running instruction can have various forms, e.g., triggered by clicking, triggered by touching a screen, and the like. The form of the running instruction is not limited in this description.

By taking a voice function as an example, a user in a game can click a voice button by using a mouse or touching a screen, so as to trigger the running instruction for the voice function.

Step S402, the target prefab which corresponds to the target function is called on basis of the running instruction to run the target function, wherein the prefab includes a control, an application program interface and a backend calling cloud function which have been configured with the preset logic and correspond to the target function.

In particular, as a response to the running instruction, the target prefab which corresponds to the target function can be called. That is, as a response to the running instruction, the control which corresponds to the target function is called, the application program interface which corresponds to the target function is called, and then the backend calling cloud function which corresponds to the target function is called, so as to run the target function.

In the above embodiments, a plurality of prefabs are stored in the database in advance, each of the prefabs corresponds to a functional setting, and each of the prefabs includes a control, an application program interface and a backend calling cloud function which have been configured with a preset logic. Upon receipt of a running instruction for a target function of a game, a target prefab is called, i.e., the corresponding control, application program interface and backend calling cloud function are called, which can improve the running efficiency of the target function.

In a possible implementation according to embodiments of the present disclosure, after the target prefab which corresponds to the target function being called on basis of the running instruction in Step S402, the game running method can further include:

(1) a calling notification for a backend calling cloud function of the target prefab is transmitted to a backend cloud function computing platform, the calling notification includes an internet protocol address of a user terminal; and (2) the calling notification instructs the backend cloud function computing platform to select a server corresponding to the internet protocol address for interaction and transmit interaction data to the user terminal to run the target function.

Wherein, the calling notification can include the internet protocol address of the user terminal, and can also include information for indicating a network address of the user terminal, such as network provider information of the user terminal.

In particular, selecting the server which corresponds to the internet protocol address can be selecting a server which is closest to the network address of the user terminal. This facilitates the server to transmit interaction data to the user terminal, and can improve the efficiency for transmitting the interaction data, so as to improve the smoothness of running the game.

In implementations, when the target prefab is called, i.e., when the control, the application program interface and the backend calling cloud function of the target function are called, the backend cloud function computing platform counts the number of times of calling the backend calling cloud function, and charges according to the number of times of calling the backend calling cloud function, instead of charging on the lease of a cloud server. This can save costs for running and developing the game. In addition, when the game is running, the server which is closest to the network address of the user terminal can be selected for data interaction, so as to improve the efficiency for transmitting the interaction data.

For example, during running the game, each time the user clicks the voice button, a calling instruction for the voice function is initiated, to call a voice prefab which corresponds to the voice function, i.e., to call the control, the application program interface and the backend calling cloud function which correspond to the voice function. When the backend cloud function computing platform receives the calling notification for the backend calling cloud function, the backend cloud function computing platform selects the closest server to obtain the voice interaction data which corresponds to the voice function, so as to implement voice interaction. Besides, the calling of the voice function is charged. For example, the charge for calling the backend calling cloud function of the voice function for 1000 times is RMB 1 yuan.

In the game running method as described above, a plurality of prefabs are stored in the database in advance, each of the prefabs corresponds to a functional setting, and each of the prefabs includes a control, an application program interface and a backend calling cloud function which have been configured with a preset logic. Upon receipt of a running instruction for a target function of a game, a target prefab is called, i.e., the corresponding control, application program interface and backend calling cloud function are called, which can improve the running efficiency of the target function.

In addition, when the backend calling cloud function of the target prefab is called, the calling notification is transmitted to the backend cloud function computing platform, and the backend cloud function computing platform can select the server which corresponds to the internet protocol address. This facilitates the server to transmit interaction data to the user terminal, and can improve the efficiency for transmitting the interaction data, so as to improve the smoothness of running the game.

Figure 5:
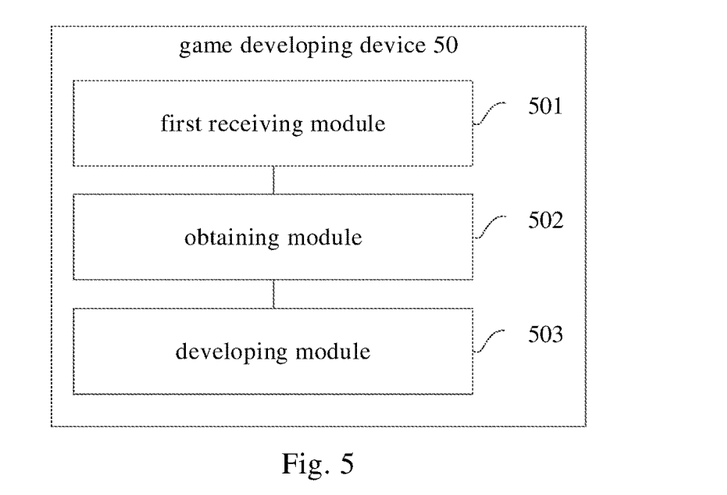
FIG. 5 is a structural diagram illustrating a game developing device according to an embodiment of the present disclosure.

Embodiments of the present disclosure provide a game developing device 50. As shown in FIG. 5, the game developing device 50 can include a first receiving module 501, an obtaining module 502 and a developing module 503.

The first receiving module 501 is configured to receive a developing instruction for a target function of a game.

The obtaining module 502 is configured to obtain a target prefab which corresponds to the target function from a preset database on basis of the developing instruction. A plurality of prefabs are stored in the database in advance, each of the prefabs corresponds to a functional setting, and each of the prefabs includes a control, an application program interface and a backend calling cloud function which have been configured with a preset logic.

The developing module 503 is configured to develop the target function of the game according to the target prefab.

In a possible implementation according to embodiments of the present disclosure, the game developing device 50 further includes a storing module which is configured to:

obtain a plurality of controls which respectively correspond to a plurality of functions, a plurality of application program interfaces which respectively correspond to the plurality of functions and a plurality of backend calling cloud functions which respectively correspond to the plurality of functions;

configure a control, an application program interface and a backend calling cloud function which correspond to a same function with the preset logic, to generate a prefab which corresponds to the function; and store the generated prefabs in the database.

In a possible implementation according to embodiments of the present disclosure, the database is arranged in a game editor.

The obtaining module 502 can be further configured to: when obtaining the target prefab which corresponds to the target function from the preset database, obtain the target prefab which corresponds to the target function from the database of the game editor; and show the target prefab in a developing and editing interface of the game editor.

In the game developing device as described above, a plurality of prefabs are stored in the database in advance, each of the prefabs corresponds to a functional setting, and each of the prefabs includes a control, an application program interface and a backend calling cloud function which have been configured with a preset logic. Upon receipt of a developing instruction for a target function of a game, the target prefab which corresponds to the target function is obtained from the preset database, and then the target function of the game is developed according to the target prefab. In development process, it is not necessary to configure the control, the application program interface or the backend calling cloud function. This can effectively reduce development workload and decrease labor, so as to effectively improve developing efficiency.

Figure 6:
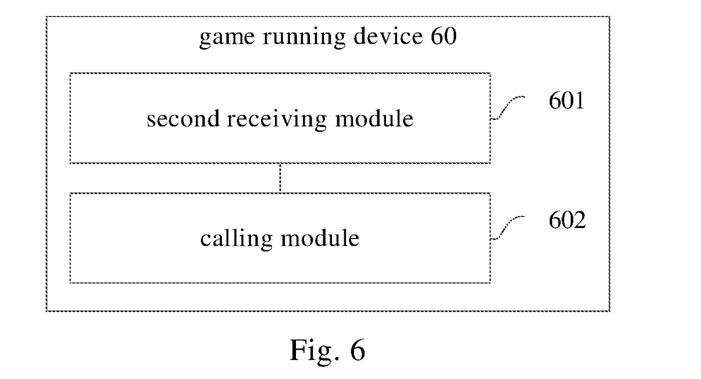
FIG. 6 is a structural diagram illustrating a game running device according to an embodiment of the present disclosure.

Embodiments of the present disclosure provide a game running device 60. As shown in FIG. 6, the game running device 60 includes:

a second receiving module 601 configured to receive a running instruction for a target function of a game from a user; and a calling module 602 configured to call the target prefab which corresponds to the target function on basis of the running instruction to run the target function, wherein the prefab includes a control, an application program interface and a backend calling cloud function which have been configured with the preset logic and correspond to the target function.

In a possible implementation according to embodiments of the present disclosure, the game running device 60 further includes a selecting module which is configured to: transmit a calling notification for a backend calling cloud function of the target prefab to a backend cloud function computing platform.

The calling notification includes an internet protocol address of a user terminal.

The calling notification instructs the backend cloud function computing platform to select a server which corresponds to the internet protocol address for interaction and transmit interaction data to the user terminal to run the target function.

In the game running device as described above, a plurality of prefabs are stored in the database in advance, each of the prefabs corresponds to a functional setting, and each of the prefabs includes a control, an application program interface and a backend calling cloud function which have been configured with a preset logic. Upon receipt of a running instruction for a target function of a game, a target prefab is called, i.e., the corresponding control, application program interface and backend calling cloud function are called, which can improve the running efficiency of the target function.

In addition, when the backend calling cloud function of the target prefab is called, the calling notification is transmitted to the backend cloud function computing platform, and the backend cloud function computing platform can select the server which corresponds to the internet protocol address. This facilitates the server to transmit interaction data to the user terminal, and can improve the efficiency for transmitting the interaction data, so as to improve the smoothness of running the game.

The game developing device according to embodiments of the present disclosure can execute a game developing method according to embodiments of the present disclosure, and is implemented in a similar principle with the game developing method. Actions performed by each module of the game developing device according to embodiments of the present disclosure correspond to steps of the game developing method according to embodiments of the present disclosure. As for detailed functions of each module of the game developing device, reference can be made to the above description of the game developing method, which is not repeated for simplicity.

On basis of the same principle of the methods according to embodiments of the present disclosure, embodiments of the present disclosure further provide an electric apparatus which can include, but not limited to, a processor and a memory. The memory is used for storing computer operation instructions, and the processor is used for performing the methods of embodiments by calling computer operation instructions. Compared with the prior art, the electric apparatus of the present disclosure can effectively reduce development workload and decrease labor costs, so as to effectively improve developing efficiency.

Figure 7:
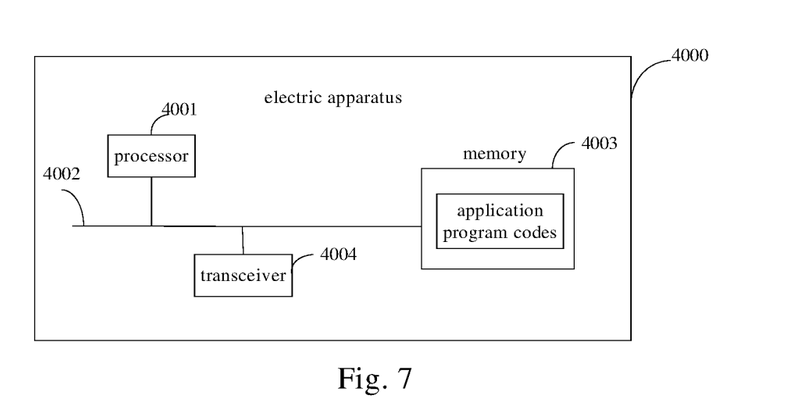
FIG. 7 is a structural diagram illustrating an electric apparatus for game developing according to an embodiment of the present disclosure.

In an optional embodiment, there is provided an electric apparatus, as shown in FIG. 7. An electric apparatus 4000 shown in FIG. 7 includes: a processor 4001 and a memory 4003. Wherein, the processor 4001 communicates with the memory 4003, e.g., via a bus 4002. Optionally, the electric apparatus 4000 can further include a transceiver 4004. It is noted that, in practical applications, the number of the transceiver 4004 is not limited to one, and the construction of the electric apparatus 4000 does not constitute any limitation to embodiments of the present disclosure.

The processor 4001 can be a CPU (Central Processing Unit), a general purpose processor, a DSP (Digital Signal Processor), an ASIC (Application Specific Integrated Circuit), an FPGA (Field Programmable Gate Array) or other programmable logic devices, a transistor logic device, hardware components or any combination thereof. The processor 4001 can implement or perform various exemplary logic blocks, modules and circuits described in conjunction with the present disclosure. The processor 4001 can also be a combination that realizes a computing function, e.g., a combination including one or more microprocessors, a combination of a DSP and a microprocessor, and the like.

The bus 4002 can include a path for delivering information among the above components. The bus 4002 can be a PCI (Peripheral Component Interconnect) bus, an EISA (Extended Industry Standard Architecture) bus, and the like. The bus 4002 can be divided in to an address bus, a data bus, a control bus, and the like. For ease of representation, only a thick line is used to indicate the bus 4002 in FIG. 7, but this does not mean there is only one bus or one type of bus.

The memory 4003 can be ROM (Read Only Memory) or other types of static storage apparatuses capable of storing static information and instructions, RAM (Random Access Memory) or other types of dynamic storage apparatuses capable of storing information and instructions, and can also be EEPROM (Electrically Erasable Programmable Read Only Memory), CD-ROM (Compact Disc Read Only Memory) or other optical disk storage, optical disk storage (including compact discs, laser discs, optical discs, digital versatile discs, Blu-ray discs, etc.), magnetic disk storage media or other magnetic storage apparatuses, or any other media which can be used to carry or store desired program codes in the form of instructions or data structures and can be accessed by a computer, but is not limited to this.

The memory 4003 is configured to store application program codes for executing the solutions of the present disclosure, and the processor 4001 controls the execution. The processor 4001 is configured to execute application program codes stored in the memory 4003 to implement contents of the method embodiment as described above.

Wherein, the electric apparatus includes, but not limited to, mobile phones, notebook computer, digital broadcast receivers, Personal Digital Assistants (PDAs), tablet computers (PADs), Portable Multimedia Players (PMPs), mobile terminals such as in-vehicle terminals (e.g., in-vehicle navigation terminals), and fixed terminals such as digital TVs and desktop computers. The electric apparatus shown in FIG. 7 is only an example, and should not constitute any limitation to the function and scope of use of the embodiments of the present disclosure.

Embodiments of the present disclosure provide a computer-readable storage medium in which a computer program is stored. When the computer program is run on a computer, the computer program enables the computer to implement contents of the method embodiment as described above. Compared with the prior art, the computer-readable storage medium of the present disclosure can effectively reduce development workload and decrease labor costs, so as to effectively improve developing efficiency.

It should be understood that although the steps in the flowchart of the accompanying drawings are sequentially displayed in accordance with the directions of arrows, but these steps are not necessarily performed in the order indicated by the arrows. Unless explicitly stated herein, the order for performing these steps is not strictly limited, and they can be performed in other orders. Moreover, at least a part of steps in the flowchart of the accompanying drawing can include multiple sub-steps or multiple stages. These sub-steps or stages are not necessarily performed at the same time, but can be performed at different times. These sub-steps or stages are not necessarily performed sequentially, but can be performed in turn or alternately with other steps or at least a part of the sub-steps or stages of other steps.

It should be noted that the computer-readable medium as described above in the present disclosure can be a computer-readable signal medium or a computer-readable medium or any combination of the two. The computer-readable medium can be, for example, but not limited to, an electrical, magnetic, optical, electromagnetic, infrared, or semiconductor system, device, or apparatus, or any combination of the above. More specific examples of computer-readable media may include, but are not limited to, electrical connections with one or more wires, portable computer disks, hard disks, Random Access Memory (RAM), Read-Only Memory (ROM), Erasable Programmable Read Only Memory (EPROM or flash memory), optical fiber, portable Compact Disk Read Only Memory (CD-ROM), optical storage device, magnetic storage device, or any suitable combination of the above. In the present disclosure, a computer-readable medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing signals. The computer-readable signal medium may also be any computer-readable medium other than the computer-readable medium, and the computer-readable signal medium may transmit, propagate or transport the program for use by or in combination with the instruction execution system, apparatus, or device. The program code contained in the computer-readable medium can be transmitted by any suitable medium, including but not limited to, wire, optical cable, RF (Radio Frequency), etc., or any suitable combination of the above.

The above-mentioned computer-readable medium may be included in the above-mentioned electric apparatus; or it may exist alone without being assembled into the electronic apparatus.

The above-mentioned computer-readable medium carries one or more programs, and when the above-mentioned one or more programs are executed by the electronic apparatus, they enable the electronic apparatus to implement the method in the above-mentioned embodiments.

The computer program code used to perform the operations of the present disclosure can be written in one or more programming languages or a combination thereof. The above-mentioned programming languages include, but not limited to, object-oriented programming languages such as Java, Smalltalk, C++, and include conventional procedural programming languages such as "C" language or similar programming languages. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (e.g., connected through internet by using an internet service provider).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for realizing the specified logical function. It should also be noted that, in some alternative implementations, the functions marked in the block may also occur in a different order from the order marked in the accompanying drawings. For example, two blocks shown one after the other may actually be executed substantially in parallel, and they may sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or can be realized by a combination of dedicated hardware and computer instructions.

The units involved in the described embodiments of the present disclosure can be implemented in software, or can be implemented in hardware. Wherein, the name of the unit does not constitute any limitation to the unit itself under certain circumstances. For example, a developing module can be further described as "a module for developing a target function".

The above description is only an alternative embodiment of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in the present disclosure (but not limited to) with similar functions are mutually replaced to form a technical solution.

What is claimed is:

1. A game developing method, applied to a game engine, comprising:
    receiving a developing instruction for a target function of a game;
    obtaining, on basis of the developing instruction, a target prefab which corresponds to the target function from a preset database that is pre-arranged in a game editor of the game engine, wherein a plurality of prefabs are stored in the database in advance, each of the prefabs corresponds to a functional setting, and each of the prefabs comprises a control, an application program interface and a backend calling cloud function which have been configured with a preset logic, wherein, the generation of the prefabs comprises grouping a plurality of controls, application program interfaces and backend calling cloud functions, and configuring a control, an application program interface and a backend calling cloud function corresponding to a function with a preset logic which corresponds to the function to generate a prefab which corresponds to the function, wherein the functions of the backend calling cloud function comprises at least one of server communication, sensitive word filtering, AI smart filtering, archive preset time and AI customer service; and
    developing the target function of the game according to the target prefab, so that when the target prefab is called when the game is running, the number of times of calling the backend calling cloud function is counted by a computing platform; and the game running is charged according to the number of times of calling the backend calling cloud function.

2. The game developing method of claim 1, further comprising:
    prior to obtaining the target prefab which corresponds to the target function from the preset database on basis of the developing instruction,
    obtaining a plurality of controls which respectively correspond to a plurality of functions, a plurality of application program interfaces which respectively correspond to the plurality of functions and a plurality of backend calling cloud functions which respectively correspond to the plurality of functions;
    configuring a control, an application program interface and a backend calling cloud function which correspond to a same function with the preset logic, to generate a prefab which corresponds to the function; and
    storing generated prefabs in the database.

3. The game developing method of claim 1, wherein obtaining the target prefab which corresponds to the target function from the preset database comprises:
    obtaining the target prefab which corresponds to the target function from the database of the game editor; and
    showing the target prefab in a developing and editing interface of the game editor.

4. The game developing method of claim 1, further comprising:
    utilizing an electric apparatus that includes: one or more processors,
    a memory, and
    one or more application programs, wherein the one or more application programs are stored in the memory, and configured to, when executed by the one or more processors, implement the game developing method.

5. The game developing method of claim 1, further comprising:
    utilizing a non-transitory computer-readable storage medium in which a computer program is stored, wherein, when the computer program is executed by a processor, the computer program implements the game developing method.

6. The game developing method of claim 1, wherein each of the prefabs is a visual component, and obtaining the target prefab which corresponds to the target function from the preset database comprises:
    showing, in the game editor, prefabs in the database;
    obtaining the target prefab in response to an action of directly moving or copying the target prefab to an editing interface of the game editor.

7. The game developing method of claim 1, wherein each of the prefabs is a visual component, and obtaining the target prefab which corresponds to the target function from the preset database comprises:

obtaining the target function input in the game editor;
showing the target prefab which corresponds to the target function in an editing interface of the game editor.

8. A game running method, comprising:
receiving a running instruction for a target function of a game from a user; and
calling the target prefab which corresponds to the target function on basis of the running instruction to run the target function, wherein the prefab comprises a control, an application program interface and a backend calling cloud function which have been configured with the preset logic and correspond to the target function, wherein, the generation of the prefabs comprises grouping a plurality of controls, application program interfaces and backend calling cloud functions, and configuring a control, an application program interface and a backend calling cloud function corresponding to a function with a preset logic which corresponds to the function to generate a prefab which corresponds to the function and pre-arranging the prefabs in a game editor of the game engine, wherein the functions of the backend calling cloud function comprises at least one of server communication, sensitive word filtering, AI smart filtering, archive preset time and AI customer service;
counting, by a computing platform, the number of times of calling the backend calling cloud function; and
performing game running charging according to the number of times of calling the backend calling cloud function.

9. The game running method of claim 8, further comprising:
after calling the target prefab which corresponds to the target function on basis of the running instruction,
transmitting a calling notification for a backend calling cloud function of the target prefab to a backend cloud function computing platform, wherein the calling notification comprises an internet protocol address of a user terminal, and
wherein the calling notification is configured to instruct the backend cloud function computing platform to select a server corresponding to the internet protocol address for interaction and transmit interaction data to the user terminal to run the target function.

10. The game running method of claim 9, wherein performing game running charging according to the number of times of calling the backend calling cloud function comprising:
obtaining the number of times of calling the backend-calling cloud function counted by the backend cloud function computing platform; and
charges according to the number of times of calling the backend calling cloud function.

* * * * *